United States Patent
Bauer et al.

[11] Patent Number: 6,021,690
[45] Date of Patent: Feb. 8, 2000

[54] OPERATIONAL CONTROL

[75] Inventors: Karl-Heinz Bauer, Bad Neustadt; Joachim Storath, Salz; Gerold Eckert, Bad Neustadt, all of Germany

[73] Assignee: Preh-Werke GmbH & Co. KG, Bad Neustadt, Germany

[21] Appl. No.: 09/066,569

[22] Filed: Apr. 27, 1998

[30] Foreign Application Priority Data

May 15, 1997 [DE] Germany .......................... 197 20 327

[51] Int. Cl.[7] .............. G05G 5/06; G05G 3/00; F16C 1/12; F16C 1/10
[52] U.S. Cl. .......................... 74/527; 74/501.6; 74/502.2; 74/471 R
[58] Field of Search .............................. 74/527, 493, 479, 74/491, 526, 475, 502.2, 489, 501.6

[56] References Cited

U.S. PATENT DOCUMENTS

| | | | |
|---|---|---|---|
| 4,244,237 | 1/1981 | Sprunger | 74/493 |
| 4,713,981 | 12/1987 | Zahn | 74/479 |
| 5,222,412 | 6/1993 | Nagano | 74/502.2 |
| 5,222,414 | 6/1993 | Kobayashi | 74/527 |
| 5,309,783 | 5/1994 | Doolittle | 74/475 X |
| 5,309,784 | 5/1994 | Kobayashi et al. | 74/475 |
| 5,622,083 | 4/1997 | Kirimoto | 74/527 X |
| 5,870,929 | 2/1999 | Bravo | 74/473.18 |

FOREIGN PATENT DOCUMENTS

| | | | |
|---|---|---|---|
| 0 493 181 A1 | 7/1992 | European Pat. Off. | 74/527 |
| 34 34 302C2 | 2/1986 | Germany . | |
| 458788 | 6/1950 | Italy | 74/527 |

*Primary Examiner*—Vinh T. Luong
*Attorney, Agent, or Firm*—Griffin, Butler, Whisenhunt&Szipl, LLP

[57] ABSTRACT

An operational control for use with a ventilation, heating, or air conditioning unit of a vehicle, that can be actuated by a turn knob comprises: a guide member for being attached to and manipulated by a turn knob, the guide member defining a guiding groove; an adjusting lever for actuating a Bowden cable to which the adjusting lever is linked, the adjusting lever being mounted adjacent the guide member to pivot; a guide pin attached to the adjusting lever for extending into the guiding groove for cooperating with the guiding groove to cause the adjusting lever to pivot when the guide member is manipulated. The adjusting lever is made of a material that can be welded to steel and the guide pin is a weld-on steel ball welded to the adjusting lever.

9 Claims, 2 Drawing Sheets

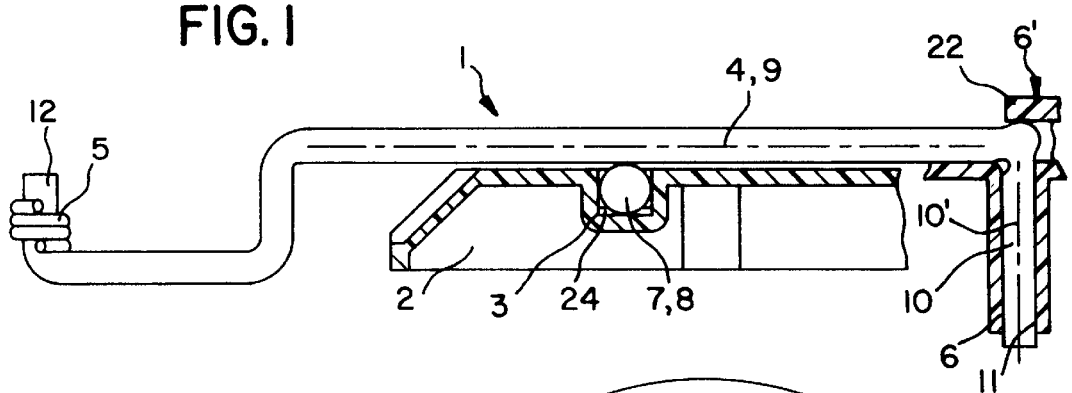
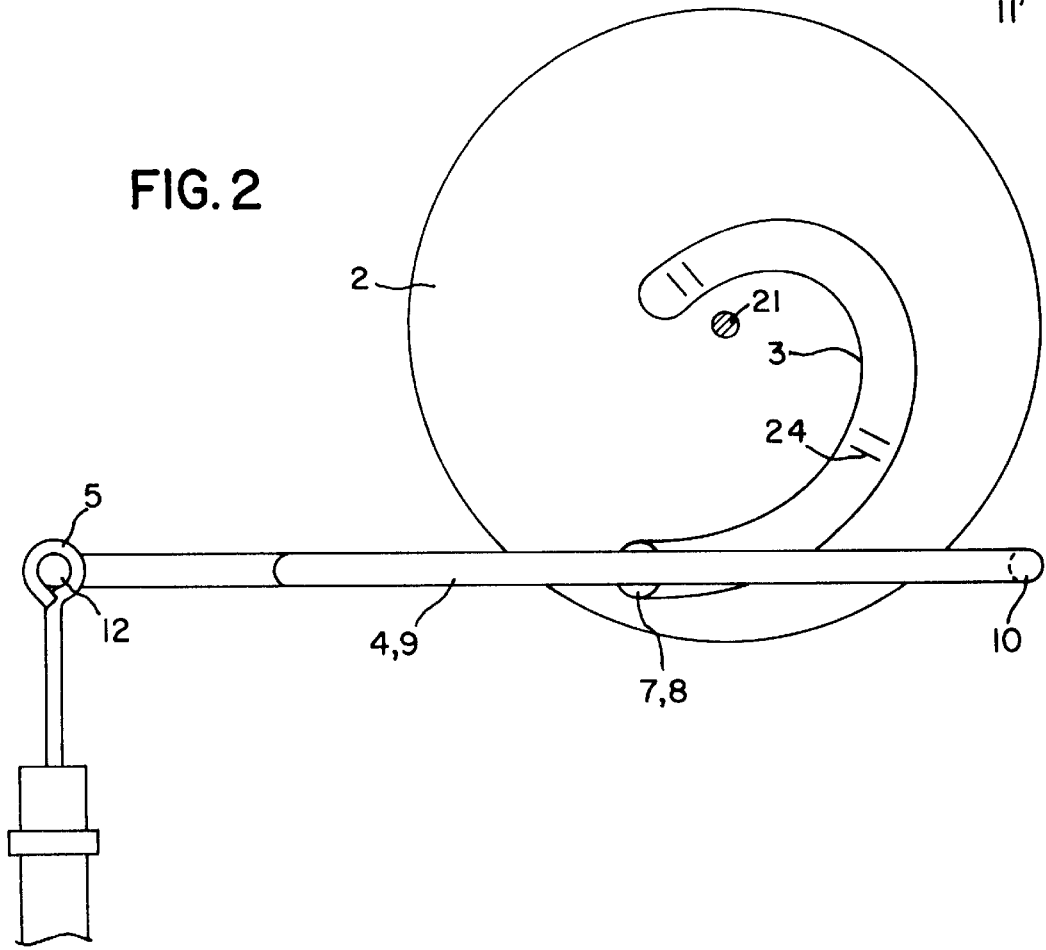

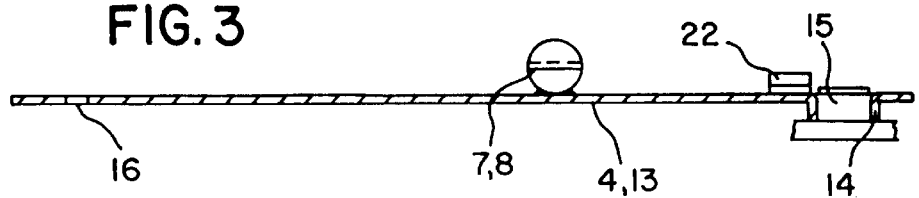
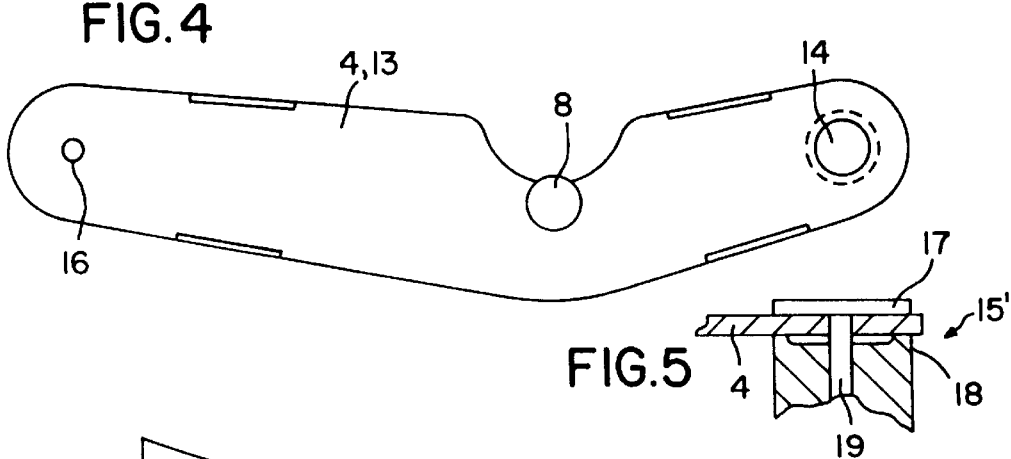
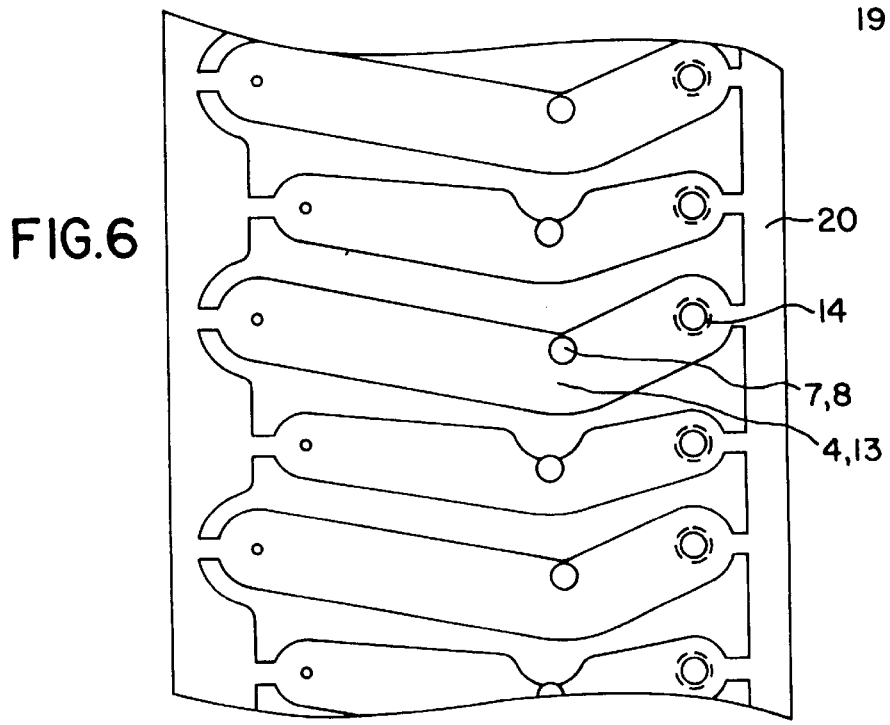

OPERATIONAL CONTROL

BACKGROUND OF THE INVENTION

This invention relates to an operational control for a ventilation, heating, or air conditioning unit of a vehicle, that can be actuated by a turn knob which engages a gearwheel or a disk having a guiding groove, or which itself has the guiding groove, whereby an adjusting lever for actuating a Bowden cable is pivotally mounted at a housing pivot bearing with a guide pin extending into the guiding groove for following the groove.

German patent document (DE 34 34 302 C3), for example, discloses an operational control of this type, wherein a rotating gearwheel works in concert with an adjusting lever that can pivot through a limited angular area about a pivot bearing of a main body for activating—in a pulling sense—a Bowden cable, with the gearwheel having a guiding groove and the adjusting lever being a one-armed, or simple, lever that is pivotally mounted at one end so that its pivot pin can pivot at the pivot bearing of the main body and is linked to the Bowden cable at the other end, the adjusting lever having a guide pin between the pivot pin and the Bowden cable that cooperates with the guiding groove of the gearwheel.

As this publication discloses, the pivot pin and guide pin should be molded onto the adjusting lever; according to the drawing, the adjusting lever has embedded pins (FIG. 6).

Thus the adjusting lever can be designed as a die-cast part to include both pins, or as a punched-out sheet part with embedded pins.

The die-cast part is made of a low-strength alloy that can be pressure-injected, so that the pins, at least, must be large enough to withstand the adjusting forces.

This reduces an angular area of adjustment and increases friction, unlike small pins.

Owing to the large number of parts, the thusly constructed adjusting lever is expensive and prone to failure.

Thus, it is an object of this invention to design an operational control of the type indicated above, wherein smooth adjustment can be achieved while an angular area of adjustment is increased and costs are reduced.

SUMMARY OF THE INVENTION

According to principles of this invention, an operational control has an adjusting lever that is actuated to pull a Bowden cable by a turn knob which manipulates a guide pin attached to the adjusting lever with a guiding groove. The adjusting lever is made of a material that can be welded to steel and the guide pin, which follows the guiding groove, is a weld-on steel ball which is weldable to the adjusting lever.

BRIEF DESCRIPTION OF THE DRAWINGS

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a schematic side, partially-cross-sectional, segmented, view of an operational control of this invention;

FIG. 2 is a top plan view of a gearwheel adjusting lever and other elements of the operational control of FIG. 1;

FIGS. 3 and 4 are top and side views of an alternate-embodiment adjusting lever and housing pin of this invention, with FIG. 3 being in partial cross-section;

FIG. 5 is a sectional view of an alternate pivot pin for mounting an adjusting lever of this invention made from punched sheet steel; and FIG. 6 is a top view of a punching strip with profiles of punched-out adjusting levers.

DESCRIPTION OF THE PREFERRED EMBODIMENT

FIG. 1 shows schematically an operational control 1 for a ventilation, heating, or air conditioning unit of a vehicle, that can be operated by a turn knob (not shown) to act upon a gearwheel or guide member 2 having a guiding groove 3; wherein an adjusting lever 4, for manipulating a Bowden cable 5, is pivotally mounted at a housing pivot bearing 6, and there is a guide pin 7 extending into, and cooperating with, the guiding groove 3 to effect pulling. In an alternate structure, however, the turn knob can also act upon a disk having the guiding groove 3, or the knob itself may have the guiding groove 3.

According to the invention, the adjusting lever 4 is made of a material that can be welded to steel and the guide pin 7 is a weld-on steel ball 8 which is welded to the adjusting lever 4.

In the FIGS. 1 and 2 embodiment, the adjusting lever 4 is made of rod steel 9 to have a bent pivot bearing pin 10 that cooperates with a housing pivot bearing opening 11, with the Bowden cable 5 being placed on a bent Bowden-cable-receiving pin 12.

FIG. 2 shows a top view with the guide member 2 and the guiding groove 3 as well as the adjusting lever 4 made of rod steel 9 having the pivot bearing pin 10, the weld-on steel ball 8, and the Bowden cable 5 on the Bowden-cable-receiving pivot pin 12.

FIGS. 3 and 4 show an alternative embodiment of the adjusting lever of FIGS. 1 and 2, wherein the adjusting lever 4 is of punched-out sheet steel 13 with a molded pivot-bearing bushing 14, that cooperates with a housing pin 15, the Bowden cable 5 being set into a Bowden cable engagement opening 16 of the adjusting lever 4.

FIG. 5 shows an alternative housing pivot bearing 6 in which a housing pin system 15' has upper and lower axially directed walls 17, 18 for guiding the adjusting lever 4, which walls extend radially outwardly a considerable distance along both sides of the adjusting lever 4. In the depicted design, the upper axial wall 17 is part of an embedded pin 19 and the lower axial wall 18 is molded onto the housing.

FIG. 6 shows a punching strip 20 with several adjusting lever contures thereon, it being intended that the adjusting lever 4 with the molded pivot-bearing bushing 14 and weld-on steel ball 8 will not be separated from the punching strip 20 until the operational control is installed.

With the operational control 1 of this invention, the adjusting lever 4 can easily be manufactured in a rod steel or punched-out sheet steel form that employs the steel ball 8 with a very smooth surface that causes only minimal friction, or wear, in the guiding groove 3 of the guide member 3. The small dimensions that are made possible by the great strength of the rod steel or punched-out sheet steel allow it to follow the guiding groove for a large angle of adjustment, and, thus, for a larger regulating distance of the Bowden cable 5; with a smaller-in-diameter bearing pin 21 also being effective for supporting the component having the guiding groove 3, thereby allowing the guiding groove 3 to extend closer to a center of the bearing pin 21. That is where the adjusting forces are greatest.

By separating the adjusting lever 4 from the punching strip 20 upon installation of the operational control, advantages are achieved in mass production. If plastic is used as the material for the housing, snap hooks 22 can be formed thereon for axially securing the adjusting lever 4. As shown in FIG. 1, the snap hook 22 impinges upon the adjusting lever 4 at a center area 10' of the housing pivot bearing opening 11, which minimizes friction.

It can be advantageous for the adjusting lever 4 to urged, with spring force the ball 8 against indexing recesses 24 in the guiding groove 3. This makes the design less expensive in comparison to snap-locating devices in the prior art.

The structure of the operational control indicated above makes it easy to manufacture the adjusting lever as rod steel or as punched-out sheet steel whose smooth-surface steel ball causes only minimal friction in the guiding groove of the guide members. The small dimensions that can be achieved due to the high degree of strength of the rod steel or punched-out sheet steel make it possible to structure the guiding groove for a rather large angle of adjustment, and thus a larger regulating distance of the Bowden cable, with a bearing pin having a smaller diameter also being effective for pivotally supporting the component having the guiding groove, so that the guiding groove can extend into close proximity with a center of the bearing pin. That is where the adjusting forces are greatest. By separating the adjusting lever from the punching strip first during installation of the operational control, advantages can be achieved in mass production. If plastic is used for the housing, snap hooks for axial securing of the adjusting lever can be formed. It is provided that a snap hook impinges on the adjusting lever at the center area of the pivot bearing, which minimizes friction. It can be advantageous for the adjusting lever to urge with elastic force the ball against indexing recesses in the guiding groove. This makes the design less expensive in comparison to positioning, or indexing, devices known in the art.

The invention claimed is:

1. An operational control for use with a ventilation, heating, or air conditioning unit of a vehicle, that can be actuated by a turn knob comprising: a guide member for being attached to and manipulated by a turn knob, said guide member defining a guiding groove; an adjusting lever for actuating a Bowden-cable, said adjusting lever including a Bowden-cable receiving member for being attached to a Bowden-cable, said adjusting lever including a mounting element for mounting said adjusting lever adjacent said guide member to pivot; a guide pin attached to said adjusting lever for extending into the guiding groove for cooperating with the guiding groove so as to cause the adjusting lever to pivot when the guide member is manipulated, wherein the adjusting lever is made of a material that can be welded to steel and the guide pin is a weld-on steel ball welded to the adjusting lever;

wherein the adjusting lever is of rod steel having as said mounting element a bent pivot bearing pin for being inserted in a housing pivot bearing opening for pivotally mounting the adjusting lever in a housing, and having a bent Bowden-cable-receiving pin as the Bowden-cable receiving member.

2. The operational control as in claim 1, wherein the operational control further includes said housing on which said adjusting lever is pivotally mounted by the bent pivot bearing pin, said housing including at least one flexible snap hook for axially engaging the adjusting lever to secure the adjusting lever in position on the housing at the pivot bearing pin.

3. The operational control as in claim 2, wherein the snap hook impinges upon the adjusting lever at a center area of the pivot bearing pin.

4. The operational control as in claim 1, wherein the guiding groove has indexing recesses therein and wherein the ball is urged under spring force applied by the adjusting lever against the indexing recesses for causing indexed movement of said adjusting lever.

5. An operational control for use with a ventilation, heating, or air conditioning unit of a vehicle, that can be actuated by a turn knob comprising: a guide member for being attached to and manipulated by a turn knob, said guide member defining a guiding groove; an adjusting lever for actuating a Bowden-cable, said adjusting lever including a Bowden-cable receiving member for being attached to a Bowden-cable, said adjusting lever including a mounting element for mounting said adjusting lever adjacent said guide member to pivot; a guide pin attached to said adjusting lever for extending into the guiding groove for cooperating with the guiding groove so as to cause the adjusting lever to pivot when the guide member is manipulated, wherein the adjusting lever is made of a material that can be welded to steel and the guide pin is a weld-on steel ball, welded to the adjusting lever, wherein the adjusting lever is made of punched-out sheet steel with a molded pivot-bearing bushing as the mounting element for cooperating with a housing pin for pivotally mounting the adjusting lever, said adjusting lever including an engagement opening as the Bowden-cable receiving member.

6. The operational control as in claim 5, wherein the housing pin is part of a housing pin system that further includes axial walls that extend along the housing pin, spaced radially outwardly from the housing pin, at opposite sides of the adjusting lever for guiding the adjusting lever.

7. A method of mounting the operational control as in claim 5, wherein the adjusting lever, with the molded pivot-bearing bushing and weld-on steel ball, is not separated from a punching strip from which the adjusting lever is punched out until the operational control is installed.

8. An operational control for use with a ventilation, heating, or air conditioning unit of a vehicle, that can be actuated by a turn knob comprising: a guide member for being attached to and manipulated by a turn knob, said guide member defining a guiding groove; an adjusting lever for actuating a Bowden-cable, said adjusting lever including a Bowden-cable receiving member for being attached to a Bowden-cable, said adjusting lever including a mounting element for mounting said adjusting lever adjacent said guide member to pivot; a guide pin attached to said adjusting lever for extending into the guiding groove for cooperating with the guiding groove so as to cause the adjusting lever to pivot when the guide member is manipulated, wherein the adjusting lever is made of a material that can be welded to steel and the guide pin is a weld-on steel ball, welded to the adjusting lever, wherein said operational control further includes a housing on which said adjusting lever is pivotally mounted at a pivot mount, said housing including at least one flexible snap hook for engaging the adjusting lever to secure the adjusting lever in position at the pivot mount.

9. An operational control for use with a ventilation, heating, or air conditioning unit of a vehicle, that can be actuated by a turn knob comprising: a guide member for being attached to and manipulated by a turn knob, said guide member defining a guiding groove; an adjusting lever for actuating a Bowden-cable, said adjusting lever including a Bowden-cable receiving member for being attached to a Bowden-cable, said adjusting lever including a mounting element for mounting said adjusting lever adjacent said guide member to pivot; a guide pin attached to said adjusting lever for extending into the guiding groove for cooperating with the guiding groove so as to cause the adjusting lever to pivot when the guide member is manipulated, wherein the adjusting lever is made of a material that can be welded to steel and the guide pin is a weld-on steel ball, welded to the adjusting lever, wherein the guiding grove has indexing recesses therein and wherein the ball is urged under spring force applied by the adjusting lever against the indexing recesses for causing indexed movement of said adjusting lever.

* * * * *